United States Patent Office 3,369,089
Patented Feb. 13, 1968

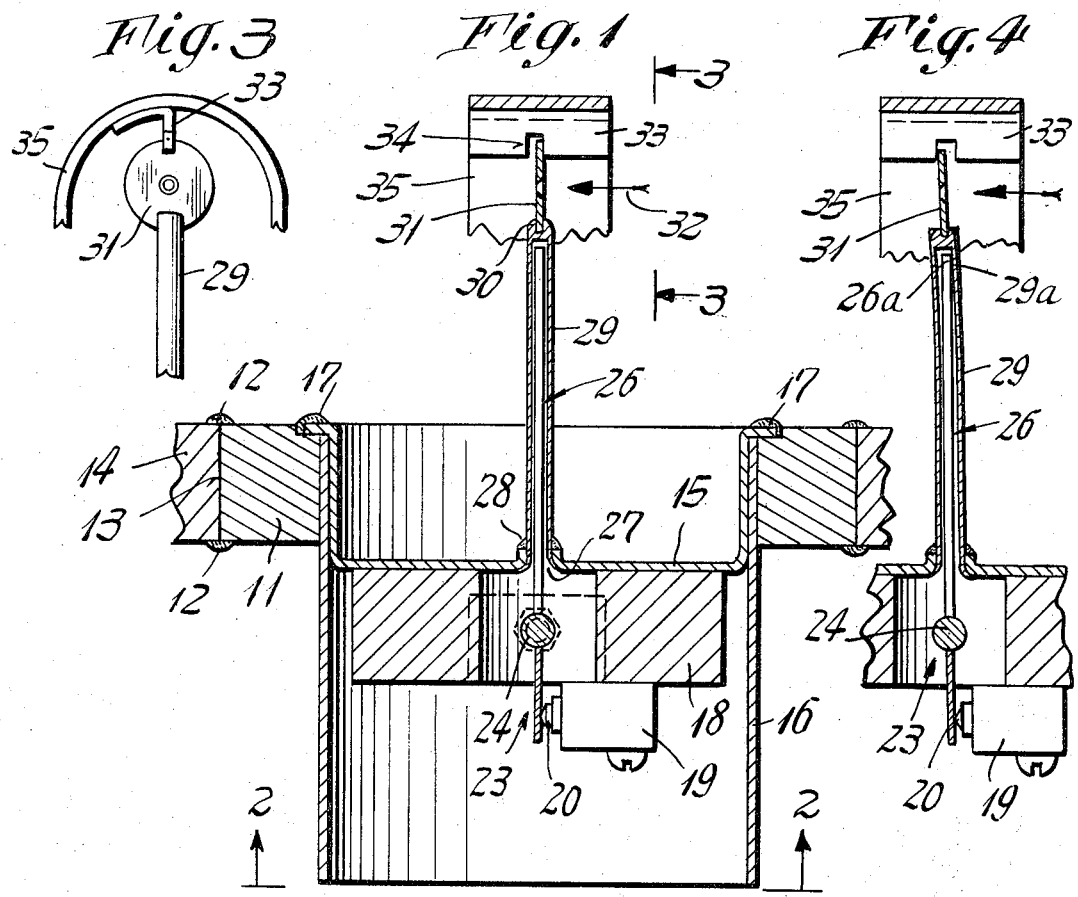

3,369,089
DISPLACEMENT TRANSMITTING DEVICE
Robert R. Hellman, Bridgeport, Conn., assignor to Westport Development & Manufacturing Company, Inc., Milford, Conn., a corporation of Connecticut
Filed Jan. 6, 1966, Ser. No. 519,134
7 Claims. (Cl. 200—81.9)

The present invention relates to a device for transmitting displacement caused by a force through a wall and more particularly to such a device which is substantially resistant to fluid pressure.

The device of the present invention has especial utility when it is mounted in a wall and used to transmit a mechanical movement related to a condition occurring on one side of the wall, through the wall while maintaining the wall hermetically impervious. Thus if the condition is relative movement between the device and a fluid, the device may be mounted in a pipe to sense fluid flow therein or on a ship to sense movement through the fluid. In either application it is immune to the pressure of the fluid.

In devices that have heretofore been suggested for transmitting a sensed condition by displacement of a portion of the device by the fluid, difficulty has arisen in attempting to achieve both sensitivity to the condition and immunity to pressure while maintaining hermetic imperviousness. If a device has been made sensitive, it has heretofore been incapable of resisting high fluid pressures without leakage or loss of calibration while devices that are primarily pressure immune are relatively insensitive.

It is accordingly an object of the present invention to provide a device which may be mounted in the wall to produce through the wall a signal indicative of a condition on one side of the wall and which device is both sensitive and pressure immune.

Another object of the present invention is to achieve the above object with a device which maintains the hermetic imperviousness of the wall even during actuation and over extreme pressure differentials.

A further object of the present invention is to provide a device in which a condition of a fluid, specifically its relative movement, on one side of a wall is utilized to actuate an electric switch positioned on the other side of the wall.

A still further object of the present invention is to provide an electric switch condition sensing device which is extremely simple in construction but yet which is reliable in use.

In carrying out the present invention, a feature thereof resides in a device that includes a base which is secured in an aperture in the wall and hermetically sealed with respect thereto, with fluid being on one side of the wall and an actuated mechanism such as an electric switch positioned on the other side. Mounted on the base is an elongate, relatively rigid tube of metal having attached at its free end, a displacement means which is responsive to a condition of the fluid and in the specific embodiment shown, as fluid motion is the condition being sensed, the displacement means consists of a paddle positioned transverse to the fluid movement. The tube is only fastened as by welding at its other end to the base and by it being a tube, it is extremely immune to pressure thereabout but yet it is somewhat flexible to a force applied to its free end which causes the tube to resiliently deform cantileverly.

The base has a hole therein which communicates with the interior of the tube and positioned within the base on the other side thereof from the tube is a pivot means which pivotally supports a lever. The lever is formed of extremely rigid material such as carbon rod and includes a sensing portion which extends through the aperture in the base and into the tube for a substantial length thereof. Extending from the other side of the pivot of the lever is an actuating arm which is adapted to engage the actuator of the electric switch.

When there is a relative motion between the tube and the fluid, the tube will bend as the fluid exerts a force on the paddle with the amount of bending being related to the amount of the force which in turn is related to the mass and velocity of the fluid. As the fluid movement increases, the tube increases its cantilever bending until the interior surface of the tube engages the sensing portion of the lever, at which time further bending of the tube will be translated into pivotal movement of the lever. The latter by being rigid will transmit such motion to its actuating portion to cause actuation of the switch. By proper adjustment of the length of the sensing portion, dimension and material of the tube, size of the paddle, position of the switch, etc., it will be appreciated that the switch may accordingly be made sensitive to a flow of fluid against the paddle. All parts are made of metal that are secured to each other by hermetically impervious joints rendering the device leakproof. Moreover the parts have configurations which inherently resist deformation due to fluid pressure.

Other features and advantages will hereinafter appear.

In the drawing:

FIGURE 1 is an axial section of the device of the present invention, shown mounted in a wall.

FIG. 2 is a view looking in the direction of the arrows 2—2 of FIG. 1.

FIG. 3 is a view looking in the direction of the arrows 3—3 of FIG. 1.

FIG. 4 is a view similar to FIG. 1 showing the relative position of the parts of the device when it has sensed a fluid flow which is sufficient to cause its actuation.

Referring to the drawing, the device of the present invention is generally indicated by the reference numeral 10 and includes an annular plug 11 that is welded as at 12 in an aperture 13 formed in a wall 14. A base is formed by a cup 15 and a cylinder 16 that are secured as by welding 17 to the plug 11. A block 18 is secured on one side of the base and mounted on the block is an electric switch 19 having an actuator 20. Further contained on the block 18 are pivot means that include a pair of pivots 21 and 22.

Pivotally mounted on the pivots 21 and 22 is a lever 23 having an intermediate pivot engaging hub 24. The lever 23 includes an actuating portion 25 which is mounted to engage the actuator 20 and operate it upon a pivotal movement of the lever 23. While other types of transducers for changing pivotal movement of the actuating portion 25 into an electric or other signal may be employed, such as linear displacement transducers, in the embodiment shown, as it is desired only to provide a signal when fluid motion is greater or less than a selected value, the switch 19 is of the snap action type that is maintained actuated only when the actuating arm keeps the outwardly urged actuator depressed.

The lever 23 further includes a sensing portion 26 which extends through an aperture 27 formed in the cup 15. Secured about the periphery of the aperture 27 as by welding 28 is one end of an elongate tube 29 having its other end free and sealed as at 30. A flat paddle or disk 31 is mounted on the free end of the tube 29. The disk 31 and tube 29 are positioned on the side of the wall 14 wherein it is desired to sense a condition, specifically relative motion, of a fluid which impinges against the disk 31. In FIG. 1, an arrow 32 indicates the direction of movement of the fluid and the force of the fluid transverse to the disk 31 produces a force which tends to bend or flex the tube 29 along a cantilever curve about the aperture 27.

In use, as the speed of the fluid increases, it causes the tube 29 to bend and the bending will increase until the end 26a of the sensing portion 26 engages the inner wall 29a of the tube. Further curving of the tube 29 in response to increasing fluid velocity will cause pivotal movement of the lever 23 as the end 26a will be caused to move by the increasing curvature of the tube 29. After a known pivotal movement of the lever, the actuating portion 25 will cause actuation of the switch 19.

Upon removal or a decrease of the force of the fluid, the tube 29 will reduce its amount of curvature, returning to its normal position and removing the pivotal force on the lever 23. This enables the lever to pivot to its normal position by the switch 19 exerting a returning force on the actuating portion 25. If desired, however, rather than rely on the urgings of the switch 19, a spring may be employed and/or the tube 29 have a normal rest position which causes pivoting of the lever away from the switch.

In the above device, the tube 29 is preferably formed of metal having a relatively small diameter, such as ⅛ O.D. and a wall thickness of one or a few hundreds of an inch. The tube 29 accordingly is relatively rigid and yet by reason of it being cantileverly mounted at just one end will be capable of being bent within its elastic limits by a relatively low force applied to its free end. The lever 23, particularly the sensing portion 26, is formed of extremely rigid material such as a high carbon steel rod in order to effectively prevent any bending thereof.

It will be appreciated that the present device may be made quite sensitive by selecting dimensions of the parts which will cause actuation of the switch 19 after a predetermined movement of the lever. For actuation by greater forces, the tube may be formed to be more resistant to bending as by shortening, the disk 31 decreased in size, the length of the rod 26 decreased while for actuation by lesser forces, opposite changes could be made and including relative lengthening of the actuating portion 25.

It will be understood that as the parts contacted by the fluid are made of metal which are joined as by welding, brazing, etc. that the device may be installed in a wall and still maintain the hermetic imperviousness of the wall while transmitting a sensed condition therethrough. Furthermore, the pressure of the fluid per se is incapable of causing the necessary motion to effect actuation and the tube 29 has a shape which inherently is capable of resisting deformation by pressure.

If desired, in order to prevent the tube 29 from being bent beyond its elastic limit by an exceedingly large force on its free end, a stop member 33 may be provided to limit the movement of the free end. Specifically the member may be formed to have a slot 34 positioned in the path of movement of the disk 31 and supported at the bight portion of an inverted U-shaped strap 35 that may be secured on the plug 11.

While the specific embodiment of the device has been disclosed as sensing a condition of fluid motion, it will be understood that it is contemplated that the device could sense other conditions such as liquid level by the substitution of a float for the disk 31.

Variations and modifications may be made within the scope of the claims and portions of the improvements may be used without others.

I claim:

1. A device for transmitting condition causing displacement on one side of a wall to provide an actuating displacement on the other side of the wall with the wall being maintained hermetically impervious comprising pivot means mounted on the other side of the wall, a lever pivoted on said pivot means and having an actuating portion and a rigid sensing portion, an aperture formed in said wall, an elongate tube having an end portion positioned substantially concentrically at the aperture and being sealingly secured to the wall to extend outwardly from the one side of the wall, said tube being relatively rigid transverse to its length and relatively resilient to cantilever bending, displacement causing means secured on the other end portion of the tube, means sealing the other end portion of the tube, said sensing portion extending through said aperture and into said tube for a substantial length thereof and having a smaller cross-sectional periphery than said inner periphery of the tube and means actuated by the actuating portion after a predetermined pivotal movement of the lever, said lever being pivoted in response to the tube being cantileveringly curved by a force on the displacement causing means.

2. The invention as defined in claim 1 in which the tube is formed of metal having a relatively small outside periphery and wall thickness to be relatively rigid to forces transverse to its length and relatively resilient to forces tending to cantileverly curve said tube.

3. The invention as defined in claim 1 in which the sensing portion of the lever is formed of metal that is rigid and having a high resistance to bending.

4. The invention as defined in claim 1 in which the condition causing displacement is relative motion between a fluid on the one side of the wall and the device and in which the displacement causing means includes a flat disk secured on the other end of the tube to be transverse to the direction of relative motion.

5. The invention as defined in claim 1 in which the device includes a pair of spaced abutments, said abutments being positioned to limit the cantilever bending of the tube to within the elastic limits of the tube.

6. The invention as defined in claim 1 in which the means actuated by the actuating portion of the lever includes a snap switch having an actuator positioned to be operated upon a predetermined pivotal movement of the lever.

7. The invention as defined in claim 1 in which the tube is formed of metal having a length many times its cross-sectional width, the sensing portion of the rod is formed of metal to be resistant against bending and in which the cross-sectional width of the rod is less than the inner diameter of the tube.

References Cited
UNITED STATES PATENTS

| | | | |
|---|---|---|---|
| 2,238,327 | 4/1941 | Jackson et al. | 200—81.9 |
| 2,952,753 | 9/1960 | Kmiecik et al. | 200—81.9 |

BERNARD A. GILHEANY, *Primary Examiner.*

H. BROOME, *Assistant Examiner.*